(12) United States Patent
Jazowski et al.

(10) Patent No.: US 8,123,549 B2
(45) Date of Patent: Feb. 28, 2012

(54) MULTIPLE LAYER CONDUCTOR PIN FOR ELECTRICAL CONNECTOR AND METHOD OF MANUFACTURE

(75) Inventors: Roy Jazowski, Ormond Beach, FL (US); Srikanth Ramasubramanian, Ormond Beach, FL (US); Dan Hawkins, Ormond Beach, FL (US); Gregory Sivik, Ormond Beach, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 12/849,649

(22) Filed: Aug. 3, 2010

(65) Prior Publication Data

US 2011/0034066 A1    Feb. 10, 2011

Related U.S. Application Data

(60) Provisional application No. 61/231,521, filed on Aug. 5, 2009.

(51) Int. Cl.
*H01R 4/24* (2006.01)
(52) U.S. Cl. ........................................... 439/426
(58) Field of Classification Search ................. 439/204, 439/271, 426, 352, 700, 936; 174/13, 24
See application file for complete search history.

(56) References Cited

U.S. PATENT DOCUMENTS

| | | |
|---|---|---|
| 2,700,140 A | 1/1955 | Phillips |
| 2,740,098 A | 3/1956 | Phillips |
| 2,758,291 A | 8/1956 | Richards |
| 3,085,138 A | 4/1963 | Brown |
| 3,092,431 A | 6/1963 | Bilbrey |
| 3,158,420 A | 11/1964 | Olson et al. |
| 3,243,756 A | 3/1966 | Ruete et al. |
| 3,307,137 A | 2/1967 | Tordoff et al. |
| 3,376,541 A | 4/1968 | Link |
| 3,471,669 A | 10/1969 | Curtis |
| 3,513,425 A | 5/1970 | Arndt |
| 3,522,576 A | 8/1970 | Cairns |
| 3,559,141 A | 1/1971 | Hardy |
| 3,587,035 A | 6/1971 | Kotski et al. |
| 3,643,208 A | 2/1972 | Massa, Jr. |
| 3,656,084 A | 4/1972 | Malia |
| 3,670,287 A | 6/1972 | Keto |
| 3,678,432 A | 7/1972 | Boliver |
| 3,736,505 A | 5/1973 | Sankey |

(Continued)

FOREIGN PATENT DOCUMENTS

GB    1537061    5/1976

(Continued)

OTHER PUBLICATIONS

U.S. Appl. No. 12/839,077, filed Jul. 19, 2010, inventor Ramasubramanian.

(Continued)

*Primary Examiner* — Jean F Duverne
(74) *Attorney, Agent, or Firm* — Procopio, Cory, Hargreaves & Savitch LLP (57) ABSTRACT

A multiple layer conductor pin for a harsh environment connector or penetrator has a conductive shaft, an outer layer of non-conductive, insulating material extending along at least part of the length of the shaft, and an intermediate layer of conductive or semi-conductive material sandwiched between the outer layer and conductive shaft and bonded substantially void-free to the outer insulating layer.

47 Claims, 3 Drawing Sheets

U.S. PATENT DOCUMENTS

| | | | | |
|---|---|---|---|---|
| 3,750,088 | A | 7/1973 | Berian | |
| 3,772,636 | A | 11/1973 | Webb | |
| 3,793,608 | A | 2/1974 | Ring et al. | |
| 3,816,641 | A | 6/1974 | Iversen | |
| 3,818,407 | A | 6/1974 | Edgerton | |
| 3,898,731 | A | 8/1975 | Ring et al. | |
| 3,952,218 | A | 4/1976 | Deters | |
| 3,982,812 | A | 9/1976 | Boliver | |
| 3,992,567 | A | 11/1976 | Malia | |
| 3,994,552 | A | 11/1976 | Selvin | |
| 4,006,288 | A | 2/1977 | Stevens | |
| 4,032,205 | A | 6/1977 | Taj | |
| 4,099,021 | A | 7/1978 | Venezia | |
| 4,142,770 | A | 3/1979 | Butler, Jr. et al. | |
| 4,174,145 | A | 11/1979 | Oeschger et al. | |
| 4,266,844 | A | 5/1981 | Chelminski | |
| 4,334,729 | A | 6/1982 | Allen et al. | |
| 4,373,767 | A | 2/1983 | Cairns | |
| 4,383,131 | A | 5/1983 | Clabburn | |
| 4,431,861 | A | 2/1984 | Clabburn et al. | |
| 4,521,642 | A | 6/1985 | Vives | |
| 4,606,603 | A * | 8/1986 | Cairns | 385/58 |
| 4,728,296 | A | 3/1988 | Stamm | |
| 4,753,604 | A | 6/1988 | Wheeler | |
| 4,790,768 | A * | 12/1988 | Domingues | 439/320 |
| 4,791,247 | A | 12/1988 | Cacalloro et al. | |
| 4,792,247 | A | 12/1988 | Sakaida et al. | |
| 4,797,117 | A | 1/1989 | Ayers | |
| 4,818,437 | A | 4/1989 | Wiley | |
| 4,854,886 | A | 8/1989 | Neuroth | |
| 4,874,324 | A | 10/1989 | Andersen et al. | |
| 4,909,751 | A | 3/1990 | Marolda, Jr. | |
| 4,948,377 | A | 8/1990 | Cairns | |
| 5,015,016 | A | 5/1991 | Smith, III | |
| 5,051,103 | A | 9/1991 | Neuroth | |
| 5,068,063 | A | 11/1991 | Tremper, III | |
| 5,070,597 | A * | 12/1991 | Holt et al. | 29/887 |
| 5,166,477 | A | 11/1992 | Perin, Jr. et al. | |
| 5,174,765 | A | 12/1992 | Williams et al. | |
| 5,193,614 | A | 3/1993 | Cox | |
| 5,203,805 | A | 4/1993 | Cairns | |
| 5,361,834 | A | 11/1994 | Cox | |
| 5,645,442 | A * | 7/1997 | Cairns | 439/201 |
| 5,670,747 | A | 9/1997 | Lawer et al. | |
| 5,700,161 | A | 12/1997 | Plummer et al. | |
| 5,808,258 | A * | 9/1998 | Luzzi | 218/136 |
| 5,833,490 | A | 11/1998 | Bouldin | |
| 5,899,765 | A | 5/1999 | Niekrasz | |
| 5,942,333 | A | 8/1999 | Arnett et al. | |
| 6,139,354 | A | 10/2000 | Broussard | |
| 6,332,787 | B1 | 12/2001 | Barlow | |
| 6,397,945 | B1 | 6/2002 | Manke et al. | |
| 6,443,780 | B2 | 9/2002 | Wilbourn et al. | |
| 6,464,523 | B1 | 10/2002 | LeVine | |
| 6,475,008 | B1 | 11/2002 | Marolda et al. | |
| 6,659,780 | B2 | 12/2003 | Parkinson | |
| 6,677,528 | B2 | 1/2004 | Amerpohl et al. | |
| 6,943,298 | B2 | 9/2005 | Nicholson | |
| 7,534,147 | B2 | 5/2009 | Marklove et al. | |
| 7,695,301 | B2 | 4/2010 | Mudge, III | |
| 7,794,254 | B2 | 9/2010 | Marklove et al. | |
| 2002/0064986 | A1 | 5/2002 | Hirai et al. | |
| 2004/0029443 | A1 | 2/2004 | Quadir et al. | |
| 2004/0248466 | A1 | 12/2004 | McCarthy | |
| 2006/0009073 | A1 | 1/2006 | Holliday | |
| 2007/0298654 | A1 | 12/2007 | Holliday | |
| 2008/0314616 | A1 | 12/2008 | Benestad et al. | |
| 2009/0047815 | A1 | 2/2009 | Nicholson | |
| 2011/0021049 | A1 * | 1/2011 | Ramasubramanian et al. | 439/201 |
| 2011/0034041 | A1 | 2/2011 | Sivik | |

FOREIGN PATENT DOCUMENTS

| | | |
|---|---|---|
| GB | 2222032 | 2/1990 |
| GB | 2 361 365 A | 10/2001 |
| GB | 2448985 | 11/2008 |
| JP | 1206813 | 8/1989 |
| JP | 2003243101 | 8/2003 |
| KR | 20040027024 | 1/2004 |
| WO | WO8400078 | 1/1984 |
| WO | WO 9713890 | 4/1997 |
| WO | WO 2007016072 | 2/2007 |

OTHER PUBLICATIONS

U.S. Appl. No. 12/841,029, filed Jul. 21, 2010, inventor Sivik et al.
Notification, International Search Report and Written Opinion for PCT/US2010/044348 dated Feb. 21, 2011.
International Search Report and Written Opinion for PCT/US2010/042522 dated Jan. 27, 2011.
International Search Report and Written Opinion for PCT/US2010/042757 dated Feb. 25, 2011.

* cited by examiner

FIG. 4A and Method of Manufacture

MULTIPLE LAYER CONDUCTOR PIN FOR ELECTRICAL CONNECTOR AND METHOD OF MANUFACTURE

RELATED APPLICATION

The present application claims the benefit of co-pending U.S. provisional pat. App. Ser. No. 61/231,521, filed Aug. 5, 2009, the contents of which are incorporated herein by reference in their entirety.

BACKGROUND

1. Field of the Invention

The present invention relates generally to electrical connector or penetrator assemblies for connecting two cables or connecting a cable to electrical equipment, and is particularly concerned with a multiple layer conductor pin for incorporation in electrical or hybrid connectors or penetrators for subsea use or use in other harsh environments, and a method of manufacturing the multiple layer pin.

2. Related Art

Electrical connector or penetrator units include one or more conductors or conductor pins which extend through the units to carry current between opposite ends of the connector or penetrator connecting two cables or a cable and electrical equipment. Typically such conductors are surrounded by an insulating sleeve or have an outer insulating layer. In a typical electrical penetrator or feed through arrangement, a conductor pin extends through a bore in an insulating sleeve or body. In a typical electrical connector, plug and receptacle units or connector parts are each attached to cables or other devices intended to be joined by the connector to form completed circuits. One or more connector pins or probes extend through the plug unit and are designed for releasable mating engagement with one or more aligned sockets in the receptacle unit. In each case, the conductive pin is surrounded by suitable insulation along at least part of its length.

Partial discharge at higher AC voltages between conductor and insulator in typical connectors and penetrators is a long term reliability problem. In a connector/penetrator the insulation is typically formed by over molding the conductor or assembling an insulator sleeve or layer over the conductor. In both of these methods, it is not possible to completely eliminate the air void between conductor and insulator, and the air void is a source for partial discharge phenomenon. For example, there is a gap between the conductor and insulator when a pre-formed sleeve is engaged over the conductor. There is also difficulty in over molding a polymer insulation onto a metal substrate and achieving a consistently bonded interface. Typically, air voids are formed at the interface due to shrinkage of the polymer during processing and coefficient of thermal expansion differences between the materials. Since air is a poor insulator when compared with typical high voltage insulations, the electrical potential (voltage) will over-stress these air voids. As the air ionizes, the result is partial discharges. The resulting damage and ozone will eventually lead to a dielectric failure of the insulation.

SUMMARY

Embodiments described herein provide a new conductor suitable for electrical connectors and penetrators.

In one embodiment, a conductor pin comprises a conductive shaft having first and second ends, at least one end of the shaft adapted for connection to a shielded or unshielded cable, an outer layer of non-conductive, insulating material extending along at least part of the length of the shaft, and an intermediate layer of conductive or semi-conductive material sandwiched between the outer layer and conductive shaft and bonded void free or substantially void free with the outer insulating layer. The conductive or semi-conductive layer extends between the conductive shaft and insulating layer for the entire length of the insulating layer, and may be a hard or substantially rigid layer.

In one embodiment, the conductive or semi-conductive layer may be coated over the conductive shaft by dipping, spraying, painting, powder coating, a physical vapor deposition process (PVD), polymer molding, or the like, and the insulating layer may be over molded over the conductor and conductive or semi-conductive layer. Alternatively, a thin sleeve of conductive or semi-conductive material may be shrunk onto the conductive shaft in a process similar to a heatshrink process before over molding the insulating layer on top of the shaft and sleeve. The conductive or semi-conductive material is selected to withstand the over molding temperature.

In an alternative embodiment, a multiple layer conductor arrangement for an electrical penetrator assembly comprises an outer sleeve of non-conductive, insulating material having a through bore and opposite first and second ends, a one piece or two piece conductive shaft extending through the sleeve, and an intermediate layer of conductive or semi-conductive material sandwiched between the outer sleeve and conductive shaft and bonded void free or substantially void free to the inner surface of the sleeve through bore. The conductive shaft may be a unitary shaft or may comprise first and second conductors which extend into opposite ends of the sleeve and are in electrical communication inside the sleeve.

The conductive or semi-conductive layer placed between the current carrying conductor and the high voltage insulator and bonded void free or substantially void free to the insulator substantially reduces or eliminates electrical stress and discharge effects resulting from potential voids between the conductor and the conductor insulation, and increases reliability in higher AC voltage connectors.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a multiple layer conductor pin for an electrical connector or penetrator which may be designed for use underwater or in other harsh environments.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
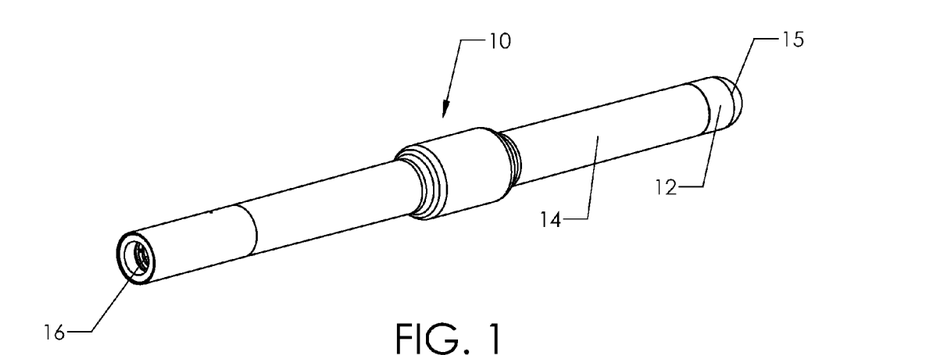
FIG. 1 is a perspective view of one embodiment of a multiple layer conductor pin.
Figure 2:
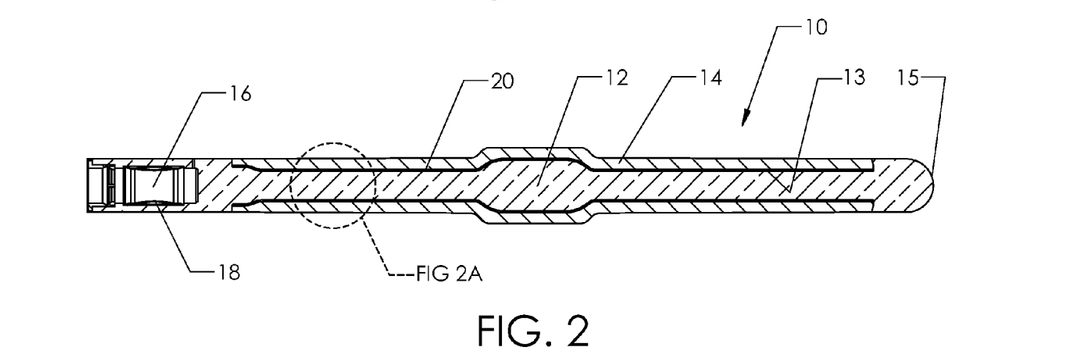
FIG. 2 is longitudinal cross-sectional view of the pin of FIG. 1.
Figure 2A:
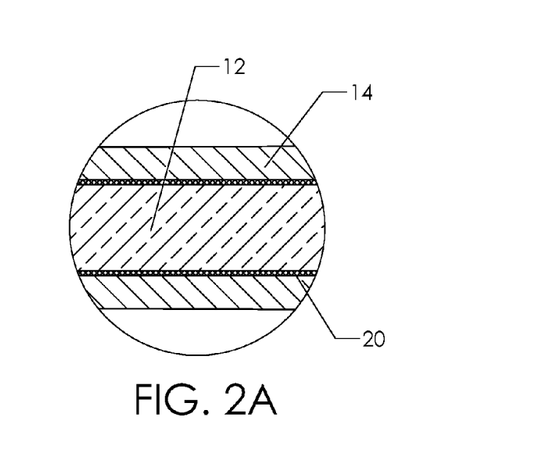
FIG. 2A is an enlarged sectional view of the circled area in FIG. 2, illustrating the conductive or semi-conductive shield layer between the current carrying conductive shaft and insulator of the pin.
Figure 3:
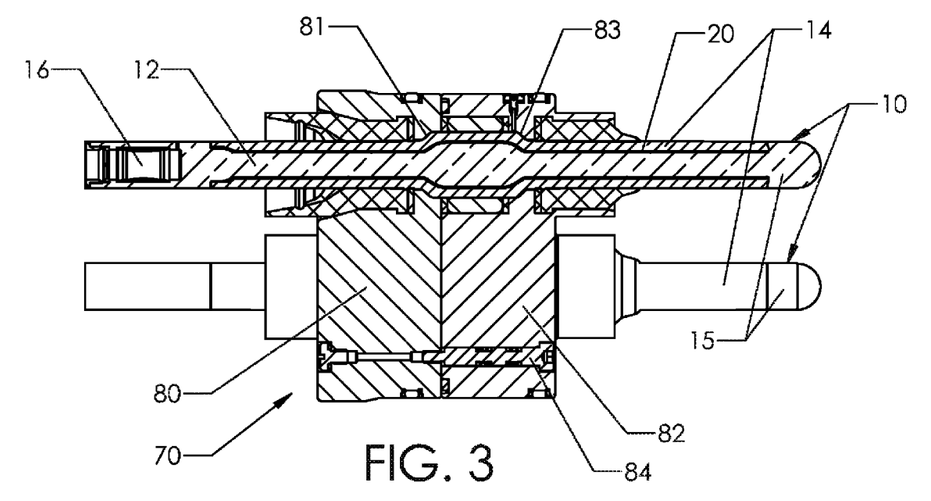
FIG. 3 is a longitudinal cross-sectional view of a plug module incorporating one or more of the conductor pins of FIGS. 1 to 2A.

FIGS. 1 to 2A illustrate a first embodiment of a conductive or semi-conductive layered conductor pin 10 suitable for incorporation in a plug unit of a releasably mateable electrical connector, such as the wet mate connector described in co-pending U.S. patent application Ser. No. 12/839,077 filed on Jul. 19, 2010, the entire contents of which are incorporated herein by reference. FIG. 3 illustrates two or more such pins incorporated in a pin module 70 designed for mounting in the outer shell or casing of a plug unit of a two part pin and socket connector. The pin may also be incorporated in plug units of other electrical or hybrid connectors, and may replace the pins or probes of any pin and socket type connector, such as the underwater connectors described in U.S. Pat. No. 5,645,442 of Cairns and U.S. Pat. No. 6,332,787 of Barlow et al, with the latter being an electro-optical connector for connecting both electrical and optical circuits.

Pin 10 comprises a conductive shaft or probe 12 of suitable rigid conductive material, and an outer insulating layer 14 of dielectric material which extends along most of the length of the pin, terminating short of exposed conductive tip 15 at the forward end of the pin which mates with a corresponding contact socket of a receptacle unit when the connector is in use. In the illustrated embodiment, the layer 14 is located in an indented outer portion 13 of the shaft, but the indented portion may be eliminated in alternative embodiments. The external shape of the pin depends on the shape of the bore in the connector module in which it is to be installed, and the pin is generally of stepped outer diameter for location in a correspondingly stepped bore. In the illustrated embodiment, the conductive shaft 12 is of stepped diameter matching that of the outer insulating layer, but may be of uniform diameter in alternative embodiments.

The conductive shaft in the illustrated embodiment may be of any suitable conductive material including metals such as copper, copper alloys, aluminum, nickel-cobalt ferrous alloy (Kovar®), and molybdenum. Shaft 12 has a rear end socket or connector 16 adapted for connection to a mating cable end connector. Alternative conductive or semi-conductive layered pins may have different end connectors depending on the cable end connector to which the pin is to be joined at the rear end of the plug unit. In the embodiment of FIGS. 1 to 3, the pin has a connector socket 16 with a contact ring 18 at its rear end. In alternative embodiments, the connector socket may be replaced with an externally threaded end portion for connection to a threaded socket cable connector, for example, or other types of end connectors.

Pin 10 has a layer 20 of conductive or semi-conductive material sandwiched between the conductive shaft 10 and insulating layer 14. The purpose of layer 20 is to provide a bonded interface at the inner surface of the insulating layer 14 which at least substantially eliminates electrical discharges as a result of voids between the conductor and insulator, which may otherwise degrade the insulation and ultimately result in component failure. Thus, layer 20 is designed to be bonded void free or substantially void-free to the insulating layer, so as to eliminate detrimental electrical stress and discharge effects of potential voids between the conductor and the insulation of the conductor when the insulation is applied directly to the conductor pin. The insulating layer 14 may be of any rigid dielectric material, including but not limited to polymers such as engineering plastic material or a thermoset material such as epoxy material and the like. The protective layer 20 is a relatively thin layer of a conductive material different from the material of conductive shaft 10, or of a semi-conductive material. In one embodiment, layer 20 is of a hard or substantially rigid material.

The sandwiched conductive or semi-conductive layer material can be applied by various methods, including but not limited to dipping, painting, spraying or powder coating, a physical vapor deposition process (PVD), or applying a layer of semi-conductive polymer material onto the shaft by over molding, with or without a post-molding machining operation to achieve controlled layer thickness. After the layer 20 is applied by any of the foregoing methods, the insulation material layer 14 is over molded onto the conductive or semi-conductive layer so as to bond void-free or substantially void free with the outer surface of layer 20. In another alternative, a semi-conductive material sleeve may be shrunk onto the shaft 12 in a process similar to a heat shrink process, with the semi-conductive material selected to withstand the over molding temperature.

In one embodiment, layer 20 is of semi-conductive material selected based on the material of the outer insulating layer, so that when the outer insulating layer is over molded over layer 20, the semi-conductive layer bonds substantially void-free to the outer insulating layer. The layer 20 may be an adhesive type material which transfers to the inside diameter of the insulation material when the insulation is molded onto the metallic pin. The melt temperature of the over molded insulating material of layer 14 is high enough to achieve bonding with the semi-conductive layer. In one embodiment, when the dielectric layer is of a polymer material such as engineering plastic or a thermoset polymer material, the layer 20 may be a carrier of the same or similar polymer material, with additives such as carbon or metallic particles to form a semi-conductive material, so that a strong bond is formed when the dielectric layer is over molded onto the intermediate layer. The carrier material may be of the same base thermoplastic or polymer material as the insulating layer, or may be of a chemically compatible material that has similar surface energy such that wetting and adhesion can occur during over molding.

In one embodiment, the semi-conductive adhesive layer is molded onto a conductive shaft in a first mold, and the resultant substrate is then placed into a second mold. The substrate may be preheated prior to insertion into the second mold in order to reduce surface moisture and improve the adhesion. The outer insulating layer is then injection molded over the substrate. Other over molding processes such as two-shot molding or co-injection molding may be used to eliminate handling steps and mold the insulation layer immediately after molding the semi-conductive layer.

As noted above, the base material of the semi-conductive layer may be the same polymer as the outer insulating layer for optimum compatibility, although different polymers or other materials which are chemically compatible with the outer insulating layer may be used in alternative embodiments. In some embodiments, a primer or plasma treatment may be used on the semiconductive substrate prior to over molding, if needed to improve adhesion. The pressure of the molding process creates intimate contact of the interface by transmitting the pressure through the fluid melt.

By suitable choice of compatible, bondable materials for the outer insulating layer and intermediate layer, the intermediate layer is bonded to the inner surface of the outer insulating layer. Any voids arising during processing are formed preferentially between the semi-conductive layer and the conductive shaft 12, which is less strongly bonded to the intermediate layer due to the dissimilar materials used for these components, and the bond between the insulating layer and intermediate conductive or semi-conductive layer is substantially void-free, avoiding or substantially avoiding partial discharges between the conductor and dielectric layer which could lead to insulation failure. The conductive or semi-conductive layer shields the outer dielectric layer preventing such discharges.

Some examples of materials for conductive or semi-conductive layer 20 when used with a dielectric layer of engineering plastic material are a resin material or resin paint containing carbon particles, a silver-plated copper shielding material in a thermoplastic binder of base material, a moly-manganese sintered coating, or the like. The thickness of layer 20 may be of the order of one micron or greater.

In an alternative embodiment which does not have a conductive shaft of stepped diameter, the insulation layer for the pin may be a pre-formed annular tube or sleeve with semi-conductive material applied void-free to the inner surface of the tube by any of the foregoing techniques, e.g. dipping, spraying, painting, coating, powder coating, PVD, or the like. The conductor shaft 12 may then be inserted and bonded to the semi-conductive layer at each end of the tube or sleeve by electron beam welding or the like. In the latter case, the conductor shaft is of uniform, non-stepped outer diameter and the tube is of substantially matching, uniform inner diameter.

As noted above, FIG. 3 illustrates two or more semi-conductive layered pins 10 mounted in a plug module 70 designed for securing in the outer shell of a plug unit, for example a plug unit as described in co-pending application Ser. No. 12/839,077 referenced above or a plug unit of any pin-and-socket type electrical or hybrid connector. Module has a two part base 80, 82 of rigid, conductive material for guiding and retaining the electrical pins 10. The two part base comprises a plug or base plate 80 and a retaining member or web plate 82 which is secured to the front of the base plate 80 via fastener screws 84. Plates 80 and 82 have aligned through bores 81, 83 through which respective electrical probes or pins 10 project. The probes or pins 10 are positioned for alignment with respective receptacle modules in a mating receptacle unit.

Figure 4:
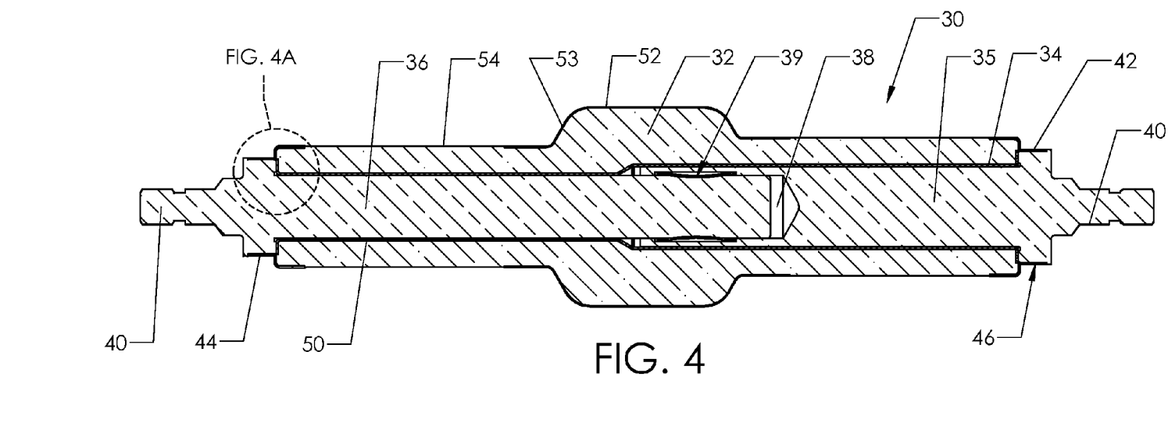
FIG. 4 is a longitudinal cross-sectional view of one embodiment of a multiple layer pin assembly for an electrical penetrator.
Figure 4A:
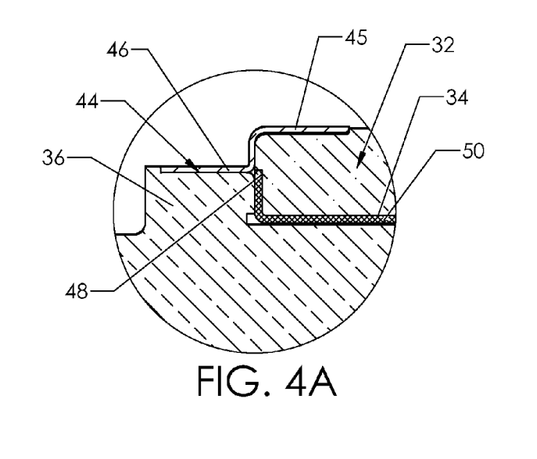
FIG. 4A is an enlarged sectional view of the circled area in FIG. 4.

FIGS. 4 and 4A illustrate another embodiment of a multiple layer conductive pin assembly 30 designed for mounting in an outer penetrator housing (not illustrated) for extending through a wall or bulkhead of a subsea vessel or container, as described in co-pending application Ser. No. 12/841,029, the entire contents of which are incorporated herein by reference. In this embodiment, the insulation for the conductor pin is a pre-formed annular tube 32, rather than a layer which is over molded onto the conductor as in FIGS. 1 to 3. The multi-layered pin assembly 30 includes outer insulating body or tube 32 having a through bore 34. The pre-formed outer insulating tube 32 may be of ceramic material, engineering plastic or other dielectric material. An internal coating layer 50 of conductive or semi-conductive material is applied to the inner surface of the dielectric tube through bore 34 and extends along the entire length of through bore 34 and over the opposite end faces 48 of the tube 32, as best illustrated in FIG. 4A. Layer 50 is bonded void-free or substantially void-free to the insulating outer tube 32, and may be applied by painting, powder coating, physical vapor deposition (PVD), polymer molding, or the like A one or two part conductor shaft extends through the internally coated tube 32. In the illustrated embodiment, the shaft is in two parts, comprising first and second conductor shaft portions 35, 36 having slidably engaged inner ends, with the first shaft portion 35 extending through a first end of the bore and terminating short of the second end of the bore, and the second shaft portion 36 extending through the second end of the bore and terminating short of the first end. The conductive shaft portions are of suitable rigid conductive material such as copper or the like. Suitable cable connectors 40 are provided at the outer ends of each shaft portion 35, 36 for connection to cables on the opposite sides of the penetrator assembly. The cable connectors may be formed integrally with the shaft portions or separately, and cable connectors of different types may be provided, depending on the type of cable end connector.

The inner ends of the two shaft portions 35, 36 are telescopically engaged, with the inner end of the first shaft portion 35 having an inwardly extending bore 38 and inner end of the second shaft portion 36 slidably or telescopically engaged in the bore, so that the overall length of the conductive pin assembly can vary. An internal sliding contact band 39 mounted in an annular recess in bore 38 provides a sliding electrical engagement or contact interface between the shaft portions while permitting the shaft portions to telescope inwardly and outwardly to compensate for various types of stress. Band 39 provides a clearance between the opposing inner surface of bore 38 and outer surface of shaft portion 36, while still providing electrical contact between the two conductive shaft portions at all times. In an alternative embodiment, the dual telescoping shaft portions may be replaced with a single conductive shaft.

Metal sealing sleeves 42, 44 at each end of the outer insulating body or tube hermetically seal the outer tube to the respective conductive shaft portions 35, 36 as they exit opposite ends of insulating body or sleeve 32. Each sleeve is substantially Z-shaped and has a first end portion 45 brazed or bonded to the outer surface and part of the end face of insulating body or tube 32, and a second, offset end portion 46 welded or brazed to the outer surface of the respective conductive shaft portion 35 or 36 adjacent the end face 48 of the tube 32, forming hermetic seals. The inner conductive or semi-conductive coating layer 50 extends around opposite end faces of the body as seen in FIG. 4A, and contacts the opposing face of the respective conductive shaft portion under pressure. The coating layer 50 may terminate short of the metal end sleeves 42, 44, or extend under the metal end sleeves up to the outer circumferential surface of the insulating tube or body 32.

One purpose of coating 50 is to provide a bonded interface at the inner surface of the dielectric body 32, allowing a clearance between the conductor shaft portions 35, 36 and the dielectric body. By providing a clearance between the dielectric body and the conductive shaft, a high conductivity material such as copper or the like may be used for the shaft while not causing issues such as thermal expansion mismatch and induced mechanical stress on the insulation and the brazed metal seals or sleeves 42, 44. Another purpose of conductive or semi-conductive layer or coating 50 is to shield the insulating body against the harmful effects of discharge which may otherwise occur between the conductive shaft and insulator. The coating layer is applied void-free or substantially void-free to the inner surface and end faces of the dielectric outer tube or body, shielding against electrical discharges which may degrade the ceramic insulation and ultimately result in component failure. Such discharges occur as a result of voids or air gaps between the conductor and insulator. By bonding a conductive or semi-conductive layer substantially void-free to the surface of the insulator which faces the conductive shaft, electrical discharges between the conductor and insulator can be substantially or completely eliminated, improving component reliability.

As noted above, the outer insulating body or sleeve 32 may be of any suitable dielectric material, such as ceramic or engineering plastic. Coating layer 50 may have a thickness of the order of one micron or greater and may be applied to the inner surface of the dielectric body by any of the techniques described above for application of a similar layer to the pin in the first embodiment, apart from application via a shrinkable sleeve. The coating or intermediate layer 50 is selected to be bondable to the dielectric layer, and may be a relatively thin layer of an epoxy-based, thermo-set adhesive material or thermoplastic material containing conductive particles, a conductive material different from the material of conductive shaft 35, 36, a resin material or resin paint containing carbon particles, a silver-plated copper shielding material, a moly-manganese sintered coating, or the like. In one embodiment, the coating layer 50 was a moly-manganese sintered coating, followed by nickel plating. In another embodiment, where the dielectric body is of thermoplastic or engineering plastic material, the coating layer may be a carrier of the same or similar engineering plastic material, or other material bondable with the dielectric material, with additional additives such as carbon or metallic particles to form a semi-conductive material.

In the embodiment of FIGS. 4 and 4A, the outer dielectric tube 32 has a central portion 52 of enlarged outer diameter and an inclined shoulder or step 53 at each end of the central portion forming a transition to the smaller diameter end portions 54. The through bore 34 is of stepped diameter to accommodate the slightly different outer diameters of the shaft portions 35, 36. However, the external shape of tube or sleeve 35 is dependent on the outer penetrator housing in which it is installed, and alternative shapes including a tube of uniform outer diameter may be used in other embodiments. In another alternative embodiment, the dual telescoping shaft portions of different diameter may be replaced with a single shaft of uniform diameter, and the dielectric tube bore may be of uniform diameter in this embodiment. An external conductive coating 52 may extend over a central portion of tube 35, terminating short of the end portions 45 of the respective sealing sleeves 42, 44 and the adjacent ends of inner coating layer 50 extending under the respective sleeves. The outer conductive coating 52 provides a uniform or substantially uniform ground plane in the assembled configuration in a penetrator housing, for controlling electrical stress imparted to the dielectric material.

In each of the above embodiments, a multi-layered conductive pin for use in a plug unit of a connector or in a hermetic electrical penetrator assembly is provided which is suitable for use in high temperature, high pressure, high voltage, and high current applications, such as underwater cable connection, powering of subsea electrical submersible (ESP) pump equipment which is used to pump hydrocarbons in oil rig installations, high temperature, high pressure downhole electrical penetrations and other electrical connections in subsea equipment of various types. In each embodiment, a conductive pin has at least three layers, comprising an inner, conductive shaft, an outer insulating layer, and an intermediate layer of conductive or semi-conductive material sandwiched between the conductive shaft or insulating layer which is bonded to at least the outer insulating layer. The intermediate layer of semi-conductive or conductive material may also be bonded to the conductive shaft, as in the embodiment of FIGS. 1 to 3, or may be separate from the shaft, as in the embodiment of FIGS. 4 and 4A. By placing a conductive or semi-conductive layer between the current carrying conductor and the high voltage insulator, partial discharges at higher AC voltages between the conductor and insulator can be reduced or eliminated. The conductive or semi-conductive layer is bonded void-free or substantially void-free to the insulator, avoiding the air voids which otherwise provide a source for partial discharge phenomena. The substantially void-free bond is achieved by suitable manufacturing processes and appropriate selection of the materials of the intermediate or shielding layer as described above.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A multiple layer conductor pin for a harsh environment connector or penetrator, comprising:
   a conductive shaft having an outer surface and first and second ends;
   an intermediate layer of conductive or semi-conductive material extending over the outer surface of the conductive shaft along at least part of the length of the pin;
   an outer layer of non-conductive, insulating material extending over the intermediate layer along at least part of the length of the intermediate layer; and
   the intermediate layer sandwiched between the outer layer and the outer surface of the conductive shaft and bonded substantially void-free to the outer insulating layer.

2. The conductor pin of claim 1, wherein the intermediate layer is bonded directly to both the outer layer and the outer surface of the conductive shaft.

3. The conductor pin of claim 2, wherein the outer layer is over molded over the intermediate layer and conductive shaft.

4. The conductor pin of claim 1, wherein the outer layer is of polymer material and the intermediate layer comprises a polymer base material bondable with the outer layer and containing conductive material additives to form a semi-conductive material.

5. The conductor pin of claim 4, wherein the polymer base material is the same polymer material as the outer layer.

6. The conductor pin of claim 1, wherein the outer layer is of thermoset material and the intermediate layer is of semi-conductive material, the semi-conductive material comprising a thermoset base material bondable with the outer layer and containing conductive material additives.

7. The conductor pin of claim 1, wherein the outer layer is of rigid material.

8. The conductor pin of claim 1, wherein the intermediate layer is an adhesive based semi-conductive material.

9. The conductor pin of claim 3, wherein the intermediate layer comprises a base material containing conductive additives, the base material comprising a material selected to adhere to the outer layer during molding of the outer layer over the intermediate layer.

10. The conductor pin of claim 9, wherein the intermediate layer comprises an adhesive thermoplastic material containing carbon or metallic particles.

11. The conductor pin of claim 1, wherein the outer layer is selected from the group consisting of engineering plastic, thermoset materials and ceramic materials.

12. The conductor pin of claim 1, wherein the intermediate layer is applied to the conductive shaft and the insulating layer is over molded onto the shaft.

13. The conductor pin of claim 12, wherein the intermediate layer is bonded to the outer surface of the conductive shaft.

14. The conductor pin of claim 12, wherein the intermediate layer comprises a painted coating of conductive or semi-conductive material.

15. The conductor pin of claim 12, wherein the intermediate layer comprises a powder coated layer of conductive or semi-conductive material.

16. The conductor pin of claim 12, wherein the intermediate layer is a polymer molded layer.

17. The conductor pin of claim 12, wherein the intermediate layer is a sprayed coating of conductive or semi-conductive material.

18. The conductor pin of claim 12, wherein the intermediate layer is a dipped coating of conductive or semi-conductive material.

19. The conductor pin of claim 1, wherein the insulating layer is a separately formed tube having an outer surface and an inner surface and the intermediate layer is bonded to the inner surface of the tube.

20. The conductor pin of claim 19, wherein the tube has opposite first and second end faces and the intermediate layer extends over the end faces of the tube.

21. The conductor pin of claim 20, further comprising a first sealing sleeve of conductive material extending between the outer surface of the tube and conductive shaft at the first end of the insulating tube and a second sealing sleeve of conductive material extending between the outer surface of the insulating tube and the conductive shaft at the second end of the insulating tube.

22. The conductor pin of claim 21, wherein the intermediate layer extends between the respective end of the insulating tube and the respective sealing sleeve at opposite ends of the tube, the intermediate layer extending across each end face of the tube at least up to the outer surface of the tube at the respective first and second ends of the tube.

23. The conductor pin of claim 1, wherein the conductive shaft is of metal.

24. The conductor pin of claim 23, wherein the conductive shaft is selected from the group consisting of copper, copper alloys, aluminum, nickel-cobalt ferrous alloy, and molybdenum.

25. The conductor pin of claim 1, wherein the pin is configured for mounting in a plug module of a pin and socket connector, the conductive shaft has a rear end adapted for connection to a cable connector and a forward end adapted for mating engagement in a contact socket of a receptacle module, and the outer insulating layer and intermediate layer each terminate short of the forward end of the conductive shaft.

26. The conductor pin of claim 1, wherein the first and second end of the conductive shaft are configured for connection to respective first and second cable end connectors.

27. An electrical plug unit for a harsh environment connector, comprising:
 a plug module of conductive material having a through bore and front and rear ends;
 a conductor pin extending through the bore and having a first end portion projecting out of the front end of the module for engagement in a forward end opening of a mating receptacle module; and
 the conductor pin comprising a conductive shaft having an outer surface and forward and rear ends, an outer layer of non-conductive, insulating material extending along at least part of the length of the shaft including part of the first end portion of the pin, the insulating layer terminating short of the forward end of the shaft to define a conductive tip, and an intermediate layer of conductive or semi-conductive material sandwiched between the outer layer and the outer surface of the conductive shaft along the entire length of the outer layer and bonded substantially void-free to the outer insulating layer.

28. The plug unit of claim 27, wherein the intermediate layer is bonded directly to both the outer layer and the outer surface of the conductive shaft.

29. The plug unit of claim 28, wherein the outer layer is over molded onto the intermediate layer and conductive shaft.

30. The plug unit of claim 27, wherein the intermediate layer is of an adhesive semi-conductive material.

31. The plug unit of claim 30, wherein the intermediate layer comprises an adhesive thermoplastic base material containing conductive additives.

32. The plug unit of claim 27, wherein the outer layer is of polymer material and the intermediate layer comprises a polymer base material containing conductive additives, the base polymer material being chemically compatible with the polymer material of the outer layer.

33. The plug unit of claim 32, wherein the base material of the intermediate layer is the same polymer material as the outer layer.

34. The plug unit of claim 32, wherein the outer layer is of rigid polymer material.

35. The plug unit of claim 32, wherein the outer layer and base material of the intermediate layer are of engineering plastic or thermoset material.

36. An electrical penetrator pin assembly for use in harsh environments, comprising:
 a pre-formed outer tube of non-conductive, insulating material having a through bore and opposite first and second ends;
 a conductive shaft extending through the tube and having opposite first and second ends extending outwardly from opposite ends of the tube; and
 an intermediate layer of conductive or semi-conductive material between the shaft and outer tube, the intermediate layer extending at least between the first and second ends of the tube and being bonded substantially void free to the tube through bore.

37. The assembly of claim 36, wherein the intermediate layer comprises a coating of semi-conductive material on the inner surface of the tube through bore.

38. The assembly of claim 36, wherein the intermediate layer comprises a layer of semi-conductive material.

39. The assembly of claim 36, wherein the intermediate layer comprises a coating of conductive material different from the material of the conductor shaft which is adhered to the tube through bore.

40. The assembly of claim 36, wherein the conductor shaft comprises first and second conductor portions, the first conductor portion extending through the first end of the bore and terminating short of the second end of the bore and having an outer end engageable with a first cable, the second conductor portion extending through the second end of the bore and terminating short of the first end of the bore and having an outer end engageable with a second cable, and the conductor portions have inner ends which are in electrical communication inside the through bore, at least one of the conductor portions being movable relative to the other conductor portion.

41. The assembly of claim 40, further comprising a first metal sealing sleeve secured to the first end of the outer tube and to the first conductor portion to form a first hermetic seal, and a second metal sealing sleeve secured to the second end of the outer tube and to the secured conductor portion to form a second hermetic seal.

42. The assembly of claim 41, wherein the intermediate layer extends over the respective first and second ends of the outer tube between the respective first and second metal sealing sleeves and the outer tube.

43. The assembly of claim 36, wherein the insulating material is selected from the group consisting of ceramic and polymer material.

44. The assembly of claim 43, wherein the intermediate layer comprises an adhesive polymer base material containing conductive additives.

45. The assembly of claim 44, wherein the insulating material is an polymer material and the polymer base material of the intermediate layer is chemically compatible with the polymer material of the outer tube, whereby the polymer base material bonds with the outer tube.

46. The assembly of claim 45, wherein the outer tube is made from the same polymer material as the base material of the intermediate layer.

47. The assembly of claim 43, wherein the intermediate layer is of engineering plastic or thermoset material.

* * * * *